US009668488B2

(12) United States Patent
Holzer et al.

(10) Patent No.: US 9,668,488 B2
(45) Date of Patent: Jun. 6, 2017

(54) CALORIE REDUCTION-TASTE RETENTION FOOD PRODUCTS

(75) Inventors: David Holzer, Miami Beach, FL (US); Shalom Aryeh Holzer, Miami Beach, FL (US)

(73) Assignee: Healthy Fiber, LLC, Miami Beach, FL (US)

(*) Notice: Subject to any disclaimer, the term of this patent is extended or adjusted under 35 U.S.C. 154(b) by 1115 days.

(21) Appl. No.: 11/160,328

(22) Filed: Jun. 20, 2005

(65) Prior Publication Data

US 2006/0286286 A1 Dec. 21, 2006

(51) Int. Cl.

| A23L 1/05 | (2006.01) |
|---|---|
| A21D 2/18 | (2006.01) |
| A21D 13/06 | (2017.01) |
| A23L 29/212 | (2016.01) |
| A23L 7/109 | (2016.01) |
| A23L 7/113 | (2016.01) |
| A23L 7/13 | (2016.01) |
| A23L 33/22 | (2016.01) |

(52) U.S. Cl.
CPC ............. *A21D 2/186* (2013.01); *A21D 13/06* (2013.01); *A23L 7/109* (2016.08); *A23L 7/113* (2016.08); *A23L 7/13* (2016.08); *A23L 29/212* (2016.08); *A23L 33/22* (2016.08)

(58) Field of Classification Search
CPC ........ A21D 2/186; A21D 13/06; A21D 10/00; A23L 1/0522; A23L 1/16; A23L 1/1643; A23L 1/1645; A23L 1/1641; A23L 1/162; A23L 1/3081
USPC ................................. 426/549, 661; 127/71
See application file for complete search history.

(56) References Cited

U.S. PATENT DOCUMENTS

| 2,802,741 A | 7/1957 | Weaver |
|---|---|---|
| 2,865,757 A | 12/1958 | Aurell |
| 2,952,548 A | 9/1960 | Work |
| 3,023,104 A | 2/1962 | Battista |
| 3,579,548 A | 5/1971 | Whyte |
| 4,109,025 A | 8/1978 | Lauck |
| 4,219,580 A | 8/1980 | Torres |
| 4,225,628 A | 9/1980 | Lynn |
| 4,247,568 A | 1/1981 | Carrington |
| 4,275,088 A | 6/1981 | Hart |
| 4,351,852 A | 9/1982 | Rule |
| 4,424,237 A | 1/1984 | Whitman |
| 4,431,681 A | 2/1984 | Hegedus |
| 4,451,489 A | 5/1984 | Beale |
| 4,526,794 A | 7/1985 | Altomare |
| 4,526,799 A | 7/1985 | Glicksman |
| 4,774,099 A | 9/1988 | Feeney |
| 4,828,846 A | 5/1989 | Rasco |
| 4,871,571 A | 10/1989 | Jensen |
| 4,950,140 A | 8/1990 | Pflaumer |
| 4,968,694 A | 11/1990 | Madsen |
| 5,051,271 A | 9/1991 | Iyengar |
| 5,073,387 A | 12/1991 | Whistler |
| 5,106,644 A | 4/1992 | El-Nokaly |
| 5,108,764 A | 4/1992 | Craig |
| 5,133,984 A | 7/1992 | Murphy |
| 5,169,671 A | 12/1992 | Harada |
| 5,194,282 A | 3/1993 | Grossman |
| 5,281,584 A | 1/1994 | Tobey |
| 5,308,639 A | 5/1994 | Fung |
| 5,466,479 A | 11/1995 | Frye |
| 5,472,732 A | 12/1995 | Ohkuma |
| 5,514,404 A | 5/1996 | Zimmerman |
| 5,593,503 A | 1/1997 | Shi |
| 5,766,662 A | 6/1998 | Inglett |
| 5,804,243 A | 9/1998 | Loh |
| 5,849,090 A | 12/1998 | Haralampu |
| 5,855,946 A * | 1/1999 | Seib et al. ................. 426/549 |
| 5,902,410 A | 5/1999 | Chiu |
| 5,906,852 A | 5/1999 | Klemann |
| 5,976,598 A | 11/1999 | Akkaway |
| 6,013,299 A | 1/2000 | Hayacs |
| 6,030,654 A | 2/2000 | Thomas |
| 6,274,179 B1 | 8/2001 | Theur |
| 6,280,526 B1 | 8/2001 | Maeda |

(Continued)

FOREIGN PATENT DOCUMENTS

JP 10276661 A * 10/1998

OTHER PUBLICATIONS

Phillips, G.O.; Williams, P.A. (2000). Handbook of Hydrocolloids. (pp. 53-64). Woodhead Publishing. Online version available at: http://knovel.com/web/portal/browse/display?_EXT_KNOVEL_DISPLAY_bookid=168&VerticalID=0.*
Judy, Tapioca Pudding and Pearl Tapioca Pudding, Apr. 2, 1998, www.recipelink.com, pp. 2.*
Susan Waring, Resistant Starch in Food Applications, Sep. 1998, Cerela Foods World, pp. 14.*
Resistant starch: Rx for Good healthby Joy Engels of Nov. 24, 2003, 3 pages.*
High-Fiber Cookies Containing Brewer's Spent Grain—Nhigh-Fiber Cookies Containing Brewer's Spent Grain—N. Prentice et al,. Cereal Chem. 55(5):712-721 (1978) (see abstract and pp. 714ff).
Organoleptic and nutritional evaluation of wheat bread, supplemented with soybean and barley flour—Shlafi Dhingara and Sudesh Jood, Food Chemistry 77 (2001) 479-488 (see abstract).
Nutritional Aspects and Safety of Modified Food Starches Otto B. Wurzburg, Nutrition Reviews vol. 44, No. 2 Feb. 1986, pp. 74-79.

*Primary Examiner* — Jyoti Chawla
(74) *Attorney, Agent, or Firm* — Israel Nissenbaum; Yitzy Nissenbaum

(57) ABSTRACT

A food product having in the range of about 1 to 3.25 calories per gram, on a dry weight basis, and comprising resistant starch with a maintained granular structure, preferably, with a chemically modification to obtain the maintained granular structure. With a type II resistant starch, the total dietary fiber within the food product arising from the resistant starch comprises 14-20% of the final food product by weight. With a type IV resistant starch, the total dietary fiber within the food product arising from the resistant starch constitutes 14-60% of the final food product by weight. The food product may be cookies, cakes, crisps, instant noodles, cheese crackers, pasta, and egg noodles.

6 Claims, No Drawings

(56) References Cited

U.S. PATENT DOCUMENTS

| | | | |
|---|---|---|---|
| 6,299,907 B1 * | 10/2001 | Seib et al. | 424/499 |
| 6,299,924 B1 | 10/2001 | Chiu | |
| 6,352,733 B1 | 3/2002 | Hayacs | |
| 6,613,373 B2 | 9/2003 | Hayacs | |
| 6,627,242 B1 | 9/2003 | McPherson | |
| 2005/0013900 A1 | 1/2005 | Dohl | |
| 2005/0031754 A1 | 2/2005 | Maningat | |
| 2005/0031755 A1 | 2/2005 | Maningat | |
| 2005/0031756 A1 | 2/2005 | Maningat | |
| 2005/0037125 A1 | 2/2005 | Maningat | |
| 2005/0129823 A1 | 6/2005 | Maningat | |
| 2008/0020121 A1 | 1/2008 | Dohl | |
| 2010/0255172 A1 | 10/2010 | Maningat | |

\* cited by examiner

CALORIE REDUCTION-TASTE RETENTION FOOD PRODUCTS

FIELD OF THE INVENTION

This invention relates to food formulations and particularly the reduction of calories without concomitant loss of mouth feel, flavor and texture.

BACKGROUND OF THE INVENTION

A low or reduced calorie product, such as chips, crackers, cookies, cakes, muffins, brownies, breakfast cereals, pasta, and the like, of a good taste has been the elusive dream of formulators for many years.

Despite the obvious desirability of these products, technological limitations have prevented food manufacturers from bringing such products to market. These limitations manifest themselves in unacceptable taste or texture, or negative effects on digestion. It is the object of this invention to delineate the existing limitations in the current art, and provide a method by which to overcome the limitations of the current art, and create acceptable products with significant calorie reduction. This reduction is defined as in excess of 30% of the standard product (i.e. below about 3.25 calories per gram on a dry weight basis, as will be explained herein).

One of the easiest paths to caloric reduction is achieved by retaining elevated levels of moisture in the final product. For example, standard white bread often exhibits a caloric value of a mere 2.6 calories per gram, simply due to its high moisture content, which approaches forty percent. Other products such as muffins (again close to 40% moisture), sponge cakes (30% moisture), and doughnuts (35% moisture) continue to bear out this trend. However, this represents a false caloric savings to the consumer, and is no more effective than drinking additional water with the product. Without providing a greater degree of satiation, the consumer will simply be hungry sooner, and will end up consuming the same or greater number of calories eventually.

Since moisture levels for baked goods such as cookies, muffins and cakes can vary dramatically between categories, and even between individual formulations within the same category, it is impossible to evaluate the true caloric reduction by looking at the published, FDA-mandated, caloric values of the finished product, since they are based solely on the calories per gram on a non-dry weight basis. Rather, the most appropriate measure to determine caloric reduction is by examining the calories per gram on a dry weight basis. This value can be obtained by dividing the total number of calories of the constituent ingredients, by the total weight in grams of the constituent ingredients less the total weight in grams of the moisture of the constituent ingredients. The term "calorie" in the context of this invention is understood to refer to the kilocalorie unit of energy, also known as the large or food calorie, which is equal to 4.186 kilojoules or one thousand thermal energy calories, and is the energy necessary to raise the temperature of one kilogram of water by one degree Celsius (1.8 degrees Fahrenheit).

One inherent difficulty in creating a low-calorie product is that there are very few raw ingredients with which to work. All common ingredients used in baking manufacture have a relatively high caloric value, on a per-gram basis. For instance, flour, sugar, and starch are all carbohydrates, and, as such, each contains approximately four calories per gram. Any proteins will also provide four calories per gram, while fats and oils provide nine calories per gram. Therefore, in a basic formulation, even if the amount of fat is greatly reduced or even entirely removed, there will still be approximately 110 calories for a 28 gram (1 ounce) serving (28× 4=112), on a dry weight basis.

There is much prior art embodied in many patents, dating back to the 1950's, which have focused on creating a large variety of low-calorie products. Although a plethora of raw ingredients have been suggested, which could, under the proper conditions, possibly produce a truly low calorie product, when it comes to actual practice and specific examples, the limitations of the use of the ingredients become apparent. In all these patents, which were attempting to create lower-calorie baked goods, such as muffins, doughnuts, cakes, cookies, and the like, the examples presented consistently only offered products with a resultant calorie count on a dry weight basis of between 3.27 and 5.57 calories per gram. Below is an exemplification collection of the patents, the example number within the patent, type of flavored baked good used in the example, and the total calories on a dry weight basis for that example. The highest and lowest values are noted in bold type.

TABLE 1

| Patent Number | Example Number | Type of flavored baked goods | Calories on a dry weight basis |
| --- | --- | --- | --- |
| 2,802,741 | 2 | Cake | 4.29 |
| 2,865,757 | 1 | Cookies | 4.47 |
| 2,865,757 | 2 | Cookies (2) | 4.45 |
| 2,952,548 | 2 | Cookie | 4.62 |
| 3,023,104 | 1 | Honey doughnuts | 3.36 |
| 3,023,104 | 2 | Peanut Butter Cookie | 4.26 |
| 3,579,548 | 15a | Cake | 3.86 |
| 4,109,025 | 16 | Biscuits (3) | 3.86 |
| 4,109,025 | 4 | Biscuits (2) | 3.85 |
| 4,109,025 | 5 | Biscuits | 3.85 |
| 4,219,580 | 10 | Chocolate cookies | 3.65 |
| 4,219,580 | 12 | Chocolate cake 2 | 3.57 |
| 4,219,580 | 13 | Cake 2 | 3.44 |
| 4,219,580 | 14 | Vanilla cookies | 4.64 |
| 4,219,580 | 16 | Cake 3 | 3.76 |
| 4,219,580 | 2 | Cake | 3.79 |
| 4,219,580 | 4 | Chocolate Cake | 3.92 |
| 4,225,628 | 1 | Yellow layer cake | 4.69 |
| 4,247,568 | 26 | Cake | 4.79 |
| 4,247,568 | 31 | Lincoln biscuit | 4.74 |
| 4,275,088 | 1 | Yellow layer cake | 4.17 |

TABLE 1-continued

| Patent Number | Example Number | Type of flavored baked goods | Calories on a dry weight basis |
|---|---|---|---|
| 4,275,088 | 3 | Yellow layer cake (2) | 4.13 |
| 4,351,852 | 1 (B) | Cake 1 | 4.36 |
| 4,351,852 | 2 | Cake 2 | 4.26 |
| 4,351,852 | 5 | Devil's Food Cake | 3.89 |
| 4,351,852 | 6 | Yellow cake | 4.00 |
| 4,424,237 | 8 | Cake | 4.09 |
| 4,431,681 | 1 | Cake | 3.28 |
| 4,431,681 | 2 | Cake (2) | 3.89 |
| 4,431,681 | 3 | Cake (3) | 3.92 |
| 4,451,489 | 2 | Cake | 3.74 |
| 4,526,794 | 4 | Orange cake | 3.87 |
| 4,526,799 | 1 | Cake | 3.82 |
| 4,526,799 | 2 | Cake 2 | 3.76 |
| 4,526,799 | 3 | Cake 3 | 3.69 |
| 4,774,099 | 2 | Brownie | 4.83 |
| 4,871,571 | 2 | Cookie | 3.77 |
| 4,950,140 | 1 | PB Cookie | 5.04 |
| 4,968,694 | 8 | Biscuit | 4.17 |
| 5,051,271 | 2-1 | Sugar cookie | 5.01 |
| 5,051,271 | 2-2 | Sugar cookie (2) | 5.12 |
| 5,051,271 | 5 | Brownies | 4.88 |
| 5,051,271 | 6 | Sugar cookie (3) | 4.61 |
| 5,073,387 | 6 | Brownie | 3.27 |
| 5,106,644 | IV-A | White cake | 4.40 |
| 5,106,644 | IV-B | White cake (2) | 4.38 |
| 5,106,644 | IV-C | White cake (3) | 4.43 |
| 5,106,644 | VI | Sugar cookies | 4.76 |
| 5,106,644 | VII-A | Rolled biscuits | 4.63 |
| 5,106,644 | VII-B | Rolled biscuits (2) | 4.57 |
| 5,108,764 | 1 | Fermented crackers | 3.98 |
| 5,108,764 | 2 | Unfermented crackers | 3.85 |
| 5,133,984 | 1-B | Loaf cake | 3.63 |
| 5,133,984 | 11 | Cake | 3.93 |
| 5,133,984 | 12 | Cake 2 | 5.00 |
| 5,133,984 | 13 | Cake 3 | 3.87 |
| 5,133,984 | 8 | Oatmeal cookie | 3.64 |
| 5,169,671 | 13-A | American pastry | 4.02 |
| 5,169,671 | 15 | Doughnut | 3.93 |
| 5,169,671 | 23-C | Sponge cake | 3.98 |
| 5,194,282 | 2 | Chocolate cake | 4.28 |
| 5,194,282 | 6 | Yellow cake | 4.05 |
| 5,281,584 | 1-6 | Cookie | 3.98 |
| 5,308,639 | 16 | Sugar cookie | 4.37 |
| 5,308,639 | 24 | Chocolate Chip Cookie | 5.24 |
| 5,466,479 | 11 | Chocolate chip cookies | 3.51 |
| 5,466,479 | 12 | Oatmeal Cookies | 3.28 |
| 5,466,479 | 13 | Blueberry muffins | 3.51 |
| 5,472,732 | 29 (Food example 22) | Donut | 4.20 |
| 5,472,732 | 31 (Food example 24) | Butter cookie | 4.04 |
| 5,472,732 | 32 (Food example 25) | Pound cake | 4.26 |
| 5,472,732 | 33 (Food example 26) | Sponge cake | 3.61 |
| 5,472,732 | 34 (Food example 27) | Apple Pie | 5.57 |
| 5,514,404 | 1 | Fermented cracker | 4.01 |
| 5,514,404 | 2 | Unfermented cracker | 4.30 |
| 5,593,503 | 6 | Oatmeal cookie | 4.90 |
| 5,593,503 | 7 | Crackers | 4.25 |
| 5,593,503 | 9 | Yellow cake | 5.37 |
| 5,766,662 | 11H | Brownie | 3.29 |
| 5,804,243 | 1 | Donut | 4.12 |
| 5,902,410 | 10 | Yellow cake | 5.37 |
| 5,902,410 | 9 | Oatmeal cookie | 4.89 |
| 5,906,852 | 2 | Cookies | 4.52 |
| 5,906,852 | 3 | Wafers | 3.78 |
| 5,906,852 | 3 | Chocolate chip cookies | 4.73 |
| 5,906,852 | 3 | Chewy Chocolate Chip Cookies | 4.31 |
| 5,906,852 | 3 | Sandwich Cookies | 3.90 |
| 5,976,598 | 3 | Cookies | 4.64 |
| 5,976,598 | 5 | Cookies (2) | 4.52 |
| 6,030,654 | 11 | Cake | 4.43 |
| 6,030,654 | 4 | Cookie | 4.14 |
| 6,280,526 | 14 | Cookie | 4.56 |
| 6,299,924 | 11 | Muffin | 3.92 |
| 6,299,924 | 12A | Yellow cake | 3.83 |
| 6,613,373 | 9 | Cookies | 4.49 |
| 6,627,242 | 1 | Pizza crust | 4.21 |

SUMMARY OF THE INVENTION

It is an object of the present invention to overcome the limitations of the existing state of the art by developing a process and ingredients by which one can produce a food product with acceptable mouth-feel, having a nutritive value between about 1 and 3.25 calories per gram, on a dry weight basis.

In order to understand the scope of the present invention it is important to initially understand that there are many ingredients used in low calorie formulations, which do not add increased bulk. These include gums, artificial sweeteners, and emulsifiers. There are however only a limited number of ingredients that can provide the low calorie bulk necessary for satiation. These ingredients fall into three categories:

1) Polyols (sugar alcohols)
2) Cellulose and related fibers
3) Enzyme-resistant starches The advantage of these ingredients is that they have a range of very low caloric values, with the lowest caloric category being the cellulose fibers, which can be as low as 0.1 calories per gram. However, despite their low caloric value, these ingredients provide satiation, and are therefore useful to help restrict caloric intake and promote weight loss. There are numerous studies that indicate that fiber produces both a satiation effect and a gastric fullness effect.

The limitation of these ingredients however is that their recommended use level in standard baking formulations is relatively low. The reason for the low recommended levels is that when these ingredients are increased to higher levels, in standard formulations, they result in imperfections in flavor or texture.

In addition, some ingredients provide another concern, in that even if they could be tolerated in the product formulation at high levels from a texture perspective, they must be restricted because of negative digestive effects. In the polyol category, for example, each polyol has recommended acceptable use levels, as dictated by the FDA, above for which a warning label must be included, suggesting that the product may have laxative effects. In addition, certain ingredients which the FDA has allowed high levels of usage have been shown to produce flatulence and other undesirable effects even at low levels.

For example, polydextrose has been shown to cause flatulence at levels of 10 grams per day, even though the FDA has determined that a laxative effect will not be felt until 90 grams per day are consumed.

The second category, cellulose fiber, is composed of alpha-cellulose, hemicellulose, lignin, and other such naturally indigestible plant material. Only insoluble fibers are considered non-caloric by the US Food and Drug Administration (FDA). Cellulose fibers impart a grainy and piece-like texture in the final product. When highly processed, they produce less graininess, but at the expense of increasing siltiness. In all forms, they produce an unacceptable mouth-feel when used at high levels in the final product. In addition, the high water absorption of the cellulose creates many additional problems in the formulation.

The third category, enzyme resistant starch, is that fraction of starch which resists digestive enzymes, and so is not digested in the small intestine. Although not exactly quantifiable due to its heterogeneous nature, some is determined as dietary fiber by the official Association of Official Agricultural Chemists (AOAC) method. Resistant starches have been categorized into four classes:

RS_I. Physically inaccessible starches found in seeds and legumes.

RS-II. Starch consumed as granular, non-gelatinized starch that is found in flour and potatoes, for example.

RS-III. Inaccessible starch formed by retrogradation caused by heating or shear. Examples would be starch in bread or RTE cereals.

RS-IV. Chemically modified starch, such as through cross-linking, substitution, or the addition of side-chains.

The prior art is however replete with the use of resistant starch. It has been postulated to add as much resistant starch as possible into baked goods but only a maximum Percentage of the Final Food Product which is Resistant to Digestion has been successfully demonstrated of 12.2%—that is 12.2% of the finished product was resistant to digestion as determined the "AOAC Method 991.43", a measure of what percentage of the starch is digested by digestive enzymes under conditions which mimic the human body. Much higher levels of the Percentage of the Final Food Product which is Resistant to Digestion, have been generally suggested but without actual substantiation.

Table 2 lists prior art experiments collected from numerous patents with their calculations of the Percentage of the Flour-Component which is Resistant to digestion, and the Final Food Product which is Resistant to Digestion. Also listed here are examples from the current patent which are included here to determine the acceptable range of functionality of the various resistant starches:

TABLE 2

| Patent Number | Percentage of the Starch which is Resistant to digestion | Percentage of the Flour-component which was Replaced with Starch | Percentage of the Flour-Component which is Resistant to digestion | Percentage of the Final Food Product which is Resistant to digestion | Resistant Starch Type | Experiment Product type |
|---|---|---|---|---|---|---|
| 6,830,767 | 40.00% | 2.20% | 0.88% | Unknown | 2 | Chips |
| 6,830,767 | 40.00% | 3.40% | 1.36% | Unknown | 2 | Chips |
| 6,613,373 | 32.00% | 50.00% | 16.00% | 8.48% | 3 | Cookies |
| 6,613,373 | 47.00% | 50.00% | 23.50% | 12.46% | 3 | Cookies |
| 6,613,373 | 34.00% | 50.00% | 17.00% | 9.01% | 2 | Cookies |
| 6,613,373 | 46.00% | 50.00% | 23.00% | 12.19% | 2 | Cookies |
| 6,613,373 | 28.00% | 50.00% | 14.00% | 7.42% | 3 | Cookies |
| 6,613,373 | 43.00% | 50.00% | 21.50% | 11.40% | 3 | Cookies |
| 6,451,367 | 20.00% | 48.27% | 9.65% | 8.40% | 2 | Cereal |
| 6,451,367 | 20.00% | 49.60% | 9.92% | 8.61% | 2 | Cereal |
| 6,451,367 | 20.00% | 11.76% | 2.35% | 1.68% | 2 | Cereal |

TABLE 2-continued

| Patent Number | Percentage of the Starch which is Resistant to digestion | Percentage of the Flour-component which was Replaced with Starch | Percentage of the Flour-Component which is Resistant to digestion | Percentage of the Final Food Product which is Resistant to digestion | Resistant Starch Type | Experiment Product type |
|---|---|---|---|---|---|---|
| 6,451,367 | 20.00% | 17.07% | 3.41% | 2.73% | 2 | Cereal |
| 6,451,367 | 20.00% | 5.00% | 1.00% | 0.60% | 2 | Bread |
| 6,451,367 | 20.00% | 10.00% | 2.00% | 1.20% | 2 | Bread |
| 6,451,367 | 20.00% | 15.00% | 3.00% | 1.80% | 2 | Bread |
| 6,451,367 | 20.00% | 20.00% | 4.00% | 2.40% | 2 | Bread |
| 6,451,367 | 20.00% | 25.00% | 5.00% | 3.00% | 2 | Bread |
| 6,451,367 | 20.00% | 24.00% | 4.80% | Unknown | 2 | Noodles |
| 6,299,907 | 70.00% | 25.00% | 17.50% | 8.11% | 4 | Cookies |
| 6,299,907 | 31.00% | 25.00% | 7.75% | 3.59% | 4 | Cookies |
| 5,902,410 | 60.00% | 14.00% | 8.40% | 3.49% | 3 | Cookies |
| 5,902,410 | 60.00% | 4.50% | 2.70% | 0.53% | 3 | Cake |
| 5,776,887 | 40.00% | 26.50% | 10.60% | 5.36% | 2 | Granola Bar |
| 5,776,887 | 40.00% | 20.40% | 8.16% | 2.80% | 2 | Cookies |
| 5,776,887 | 40.00% | 26.80% | 10.72% | 4.40% | 2 | Snack Bar |
| 5,593,503 | 40.00% | 14.00% | 5.60% | 2.33% | 3 | Cookies |
| 5,593,503 | 40.00% | 4.50% | 1.80% | 0.35% | 3 | Cake |
| 5,593,503 | 40.00% | 16.45% | 6.58% | 4.10% | 3 | Crackers |
| 5,593,503 | 40.00% | 16.66% | 6.66% | 6.00% | 3 | Cereal |

Once levels near 20% were reached, the prior art was not able to achieve a product with acceptable organoleptic properties. Alternatively, in a low calorie formulation, where the amount of fat is by necessity limited (since fat contains 9 calories per gram, as opposed to the 4 calories per gram of starch or protein), the amount of resistant starch that can be tolerated from a functional and organoleptic standpoint is far lower. It is possible that high levels of fat are able to mask the negative organoleptic properties of the resistant starch. In the prior art and current state of the art the amount of resistant starch employed is relatively small. In addition, Kraft/Nabisco, the leading baked-goods manufacturer in the world, indicated in its U.S. Pat. No. 6,613,373 that the best achievable results for flour replacement have been found with resistant starch type III. However with respect to resistant starch types III and IV, Kraft/Nabisco propounded that they are not as suitable for use as a flour replacement and characterized them as having low melting points, which do not survive a baking process, and do not exhibit good baking functionality. For example, granular starches in the presence of excess water melt at a temperature of about 80 degree C. to about 100 degree C., which is generally below baking temperatures for cookies and crackers. Kraft/Nabisco further found that the digestibility of starch may be reduced by cross-linking or the presence of various substituents such as hydroxypropyl groups. However, the chemical or thermal modification of the starch, which results in a type IV resistant starch, often affects the baking characteristics of the starch. In addition, chemically or thermally modified starches may exhibit undesirable flavors or colors when used in substantial amounts in baked goods. In contrast the type III resistant starch was found by Kraft/Nabisco to be thermally very stable, which is highly advantageous for producing reduced-calorie baked goods.

In accordance with the present invention, despite the teachings of the prior art it has been experimentally discovered that resistant starch types II and IV actually produce a far superior product to RS III in formulations which follow.

Generally the present invention comprises food products having in the range of about 1 to 3.25 calories per gram, on a dry weight basis, and comprising resistant starch with a maintained granular structure (preferably with a chemical modification). Starch can be chemically modified to achieved resistancy using any of a vast array of reactions, each with their own optimum temperature, pH, and other reaction conditions. In general, however, the actual reaction (or reactions) fall into two broad categories: the addition or substitution of chemical side-chains onto the starch molecule. Cross-linking can be viewed a subset of the former category, in which the added "side-chain" is another starch molecule. The plethora of possible modifications available for actual use is severely limited (though not a limitation of the present invention) by the FDA's Code of Federal Regulations, Title 21, Volume 3, Section 172.892 "Food starch-modified.", which allows only a small number of chemical compounds to be used, and at restricted usage levels as well. The most likely chemical approved modifications which can be used, alone or in combination, are then: modification by oxidation, etherification, or esterification; the addition of acetyl or phosphate groups (acetylation or phosphorylation, respectively); or the cross-linking of starch molecules by adipic or phosphate bonds. In particular the resistant starch is a type II resistant starch, and wherein the total dietary fiber arising from the resistant starch constitutes 14-20% of the final food product by weight. Alternatively the resistant starch is a type IV resistant starch, and wherein the total dietary fiber arising from the resistant starch constitutes 14-60% of the final food product by weight.

The food products containing a type II resistant starch, preferably have the resistant fraction of the flour component of the product constitutes 25-30% of the flour component by weight. Similarly the food products containing a type IV resistant starch, preferably have the resistant fraction of the flour component of the product constituting 25-80% of the flour component by weight.

DETAILED DESCRIPTION OF THE INVENTION

It has been experimentally determined that the amount of resistant starch that can be added to a product varies greatly depending on the type (RS-III, RS-II, or RS-IV) of the resistant starch being utilized. In extensive experiments it was found that:

When RS-III was used, then when the Percentage of the Final Food Product which is Resistant to Digestion ("PFFPRD") was above around 11%, creation of a product acceptable in organoleptic evaluation was unable to be made. Somewhat acceptable results were obtained at around 7% PFFPRD.

When RS-II was used, then when the PFFPRD was above around 20% creation of a product acceptable in organoleptic evaluation was unable to be made. Somewhat acceptable results were obtained at around 14% PFFPRD.

Surprisingly when RS-IV was used, then even when the PFFPRD was as high as 60% a product acceptable in organoleptic evaluation was readily obtained.

Another way at looking at this is seeing the Percentage of the Flour-Component which is Resistant ("PFCR") to digestion as compared to the total flour component (column D). This percentage is stated in a different way in the prior art patents in Table 2, which typically give the Percentage of the Starch which is Resistant to digestion (second column) and Percentage of the Flour-component which was Replaced with Starch (third column). These two factors were taken and multiplied to arrive at the Percentage of the Flour-component which is Resistant to digestion (fourth column). In all the experiments cited in the existing patent literature, the PFCR was at most 23.5%.

In further extensive experiments it was found that

When RS-III was used, then when the PFCR was 30%, creating a product acceptable in organoleptic evaluation was not possible. Somewhat acceptable results were obtained at 15% PFCR.

When RS-II was used, then when the PFCR was 60% creating a product acceptable in organoleptic evaluation was not possible. Somewhat acceptable results were obtained at 30% PFCR.

When RS-IV was used, then even when PFCR was 80%, creation of a product acceptable in organoleptic evaluation was readily possible.

The rationale behind this discovery seems to be that since RS-III's retrogradation destroys its granular structure:

a) RS-III has a higher level of water absorption which makes it difficult to form into a dough, with textural issues when creating a dry product and not allowing the granules to fully swell; and b) the particles of RS-III are irregular and amorphous, with no definite size or shape, resulting in a grainy texture in finished products In contrast, RS-II maintains more of the granular structure, and therefore performs better in formulations. But since its granular structure is unprotected, it is often broken down to an extent in processing, resulting in similar negative effects to those observed in RS-III.

RS-IV has cross-links which provide a protective barrier not only against digestive enzymes (amylase), but also of the granular structure. This makes it the most workable and acceptable form for the products claimed in this patent.

Consequently, in accordance with the present invention and included there are all products utilizing RS-IV with a PFFRD from 14-60%, and/or a PFCR from 25-80%. Additionally, all products utilizing RS-II with a PFFRD from 14-20% and/or a PFCR from 25-30% are within the scope of the present invention.

EXPERIMENTAL EXAMPLES

The resistant starches which were used for these experiments fit into three of the resistant starch categories described above, namely types II, III, and IV. FiberSym 70 and FiberSym 80 are type IV resistant starches derived from wheat and potato starches, with 70% and 80% resistant starch content, respectively, and are supplied by MGP Ingredients, Inc. GemStar R70 is also a type IV resistant starch derived from wheat starch with 70% resistant starch content. It is manufactured by Manildra Group USA using an undisclosed process, which the manufacturer claims is not identical to that employed in the FiberSym starches. Novelose 260 is a type 11 resistant starch with 60% resistant starch, and Novelose 330 is a type III resistant starch with 30% resistant starch. Both of the Novelose starches are derived from corn starch, and are supplied by National Starch and Chemical Company. ActiStar 11700 is a type III resistant starch derived from tapioca starch (maltodextrin), with 50% resistant starch content, and is supplied by Cargill Inc. Other non-resistant starches used as controls in the experiments include unmodified potato and corn starches.

Unmodified potato and corn starches exhibit low water binding capacity, of about 91% and 95% their weight in water, respectively. These starches also leach significant quantities of amylose, and to a higher degree in corn starch than in potato.

The chemical treatment undergone by FiberSym 70 and FiberSym 80 to become partially resistant to digestion allows the granular structure of the starch to remain intact, except for some minor shrinkage, resulting in the maintenance of a low water binding capacity, of about 70% and 80% their weight in water, for FiberSym 70 and FiberSym 80 respectively. Additionally, the processing reduces the amount of amylose leakage from the granules. The GemStar R70 performs similarly to the FiberSym.

Novelose 260 (RS type II) is considered a "natural" resistant starch, and its granular structure is unaffected during the processing. Its water binding capacity is somewhat elevated, however, since it is able to bind 115% of its weight. By contrast, in Novelose 330 (RS type III) the entire starch, even the enzyme-susceptible component, is altered during processing through thermal retrogradation, and the entire granular structure is lost. Its water binding capacity increases to 200% of its weight. ActiStar 11700 performs similar to the Novelose 330.

Olean is an indigestible oil (sucrose polyester) supplied by the Procter & Gamble Company, and approved by the FDA for use in fried snack products, such as the crisp experiments described below.

I. Cookies

These experiments were conducted by combining and blending the dry ingredients thoroughly, in the order given below. The wet ingredients were then combined in the order given below and added to the dry ingredients. Water was added until it formed an acceptable batter. In cases where too much water was added, additional starch was added to compensate, as recorded below. The dough was then formed into 10 flattened circular cookies 1.5-inches in diameter (similar to standard "Nilla" wafers), placed onto a greased cookie sheet, and baked at 375 Fahrenheit until lightly browned. The exact baking time is recorded below.

Some experiments employed quantities of standard unbleached all-purpose wheat flour in addition to the starch. Those experiments, and the quantities of flour used, are indicated in the Flour Quantity column. All material units are in grams and times are in minutes.

Base ingredients:

| Starch (see below) | (see below for quantity) |
|---|---|
| Crisco | 2.5 |
| Sugar | 5 |
| Corn Syrup | 5.5 |
| Condensed Milk | 5 |
| Vanilla (McCormick) | 1 |

-continued

| Starch (see below) | (see below for quantity) |
|---|---|
| Salt | 0.1 |
| Whole Egg | 4 |
| Gluten | 4 |
| Baking Powder | 0.3 |
| Xanthan Gum | 0.1 |

| Experiment Number | Starch Type | Starch Quantity | Flour Quantity | Water Quantity | Bake Time | Notes |
|---|---|---|---|---|---|---|
| 1 | Unmodified Corn Starch | 27 |  | 8 | 8, 12 | Good, slightly tougher texture |
| 2 | Unmodified Potato Starch | 30 |  | 2.5 | 8 | Good |
| 3 | FiberSym 70 (RS-IV) | 25 |  | 2.5 | 8 | Good |
| 4 | FiberSym 80 (RS-IV) | 25 |  | 2.5 | 8 | Good |
| 5 | Novelose 260 (RS-II) | 25 |  | 12 | 8, 14 | (High moisture) Starchy initially, turned wet and mushy the next day |
| 6 | Novelose 260 (RS-II) | 25 |  | 5 | 8, 12 | (Low moisture) Starchy, chalky |
| 7 | Novelose 260 (RS-II) | 25 |  | 2.5 | NA | Unable to form dough |
| 8 | Novelose 260 (RS-II) | 12.5 | 12.5 | 3 | 8 | A bit moist, maybe some starchiness, but nominally acceptable |
| 9 | Novelose 330 (RS-III) | 25 |  | 14 | 8, 12, 14 | Dense, chewy, nearly inedible; too chalky, awful |
| 10 | Novelose 330 (RS-III) | 25 |  | 2.5 | NA | Unable to form dough |
| 11 | Novelose 330 (RS-III) | 12.5 | 12.5 | 8.5 | 8, 10 | Also moist, slight degree of graininess and starchiness, but edible; not as light as the type IV cookies Baked some for another 2 minutes, which helped reduce moistness |
| 12 | ActiStar 11700 (RS-III) | 25 |  | 2.5 | 8 | Awful, grainy, sticks to teeth |
| 13 | GemStar R70 (RS-IV) | 25 |  | 2.5 | 8 | Slightly starchy A bit dense, odd odor, but nominally acceptable |

Summary: Using the FiberSym 80 product, which contains the highest percentage of resistant starch, and provides a very acceptable product, the final product provides 2.66 calories per gram on a dry weight basis, well within the range of 1 to 3.25 calories per gram of the present invention.

II. Chocolate Cake

These experiments were conducted by combining and blending the dry ingredients thoroughly, in the order given below. The wet ingredients were then combined in the order given below and added to the dry ingredients. Water was added until it formed an acceptable batter. The amount of water is variable, and is recorded below. The batter was then poured into a greased loaf pan, and baked at 350 degrees Fahrenheit for at least 15 minutes.

Base ingredients:

| | |
|---|---|
| Starch (see below) | 26 |
| Sugar | 10 |
| Ghirardelli chocolate | 5 |
| Baking Powder | 0.7 |
| Nutrasweet | 0.5 |
| Xanthan Gum | 0.3 |
| Baking Soda | 0.2 |
| Condensed Milk | 5 |
| Vanilla Extract | 1 |
| Whole Eggs | 20 |

| Experiment Number | Water | Starch Type | Notes |
|---|---|---|---|
| 1 | 20 | FiberSym 80 (RS-IV) | Batter was runny<br>Final product was good and cake-like |
| 2 | 20 | FiberSym 70 (RS-IV) | Batter was runny<br>OK, but not as good as the FS-80 |
| 3 | 20 | Novelose 260 (RS-II) | (Low moisture)<br>Batter was sticky<br>Final product was wet and gummy after 15, so put half back in for another 10 minutes<br>Neither version (baked for 15 or 25) was very good |
| 4 | 35 | Novelose 260 (RS-II) | (High moisture)<br>Batter was runny<br>Baked for 25 minutes total, in attempt to dry it out to an acceptable texture<br>Final product was gummish, brownie-like |
| 5 | 35 | Novelose 330 (RS-III) | Batter was too dry with 20 g water, so upped to 35. Batter at that point was sticky, similar to the Novelose 260.<br>Was wet and gummy after 15, so put back in for another 10 minutes<br>Bad, grainy, starchy, nearly inedible; worse than the Novelose 260, even. |
| 6 | 20 | Unmodified Corn Starch | Good, perhaps a bit tough |
| 7 | 20 | Unmodified Potato Starch | Too rubbery, elastic |

Summary: Using the FiberSym 80 product, which contains the highest percentage of resistant starch, and provides a very acceptable product, the final product provides 2.39 calories per gram on a dry weight basis, within the range of 1 to 3.25 calories per gram of the present invention.

III. Crisps 1

These experiments were conducted by combining the starch and salt with 3 g of Vital Wheat Gluten and 15 g of water. Additional gluten and water were added in 1 g and 2 g increments (respectively) until the dough attained an appropriate machinable consistency. The dough was then rolled through a hand-operated double roller to achieve a uniform thickness, cut into strips, baked for 12 minutes at 375 degrees Fahrenheit, and fried in Olean for 1 minute at 375 Fahrenheit.

Base ingredients:

| | |
|---|---|
| Starch (see below) | 25 |
| Gluten (initial) | 3 |
| Water (initial) | 15 |
| Salt | 1 |

| Experiment Number | Added gluten | Added water | Starch type | Notes |
|---|---|---|---|---|
| 1 | | 4 | Unmodified Corn Starch | Very crunchy, a bit sticky on teeth |
| 2 | | 0 | Unmodified Potato Starch | Very crunchy |
| 3 | | 10 | Novelose 260 (RS-II) | Stuck to teeth |
| 4 | 3 | 22 | Novelose 330 (RS-III) | Burnt, gritty |
| 5 | | 4 | FiberSym 70 (RS-IV) | Brittle, crumby, a little starchy |

-continued

| Experiment Number | Added gluten | Added water | Starch type | Notes |
|---|---|---|---|---|
| 6 | | 4 | FiberSym 80 (RS-IV) | Very crunchy, tiny bit starchy, but doesn't stick to palate |

IV. Crisps 2

These experiments were conducted by combining the starch and salt with 3 g of Vital Wheat Gluten and 15 g of water. Additional gluten and water were added in 1 g and 2 g increments (respectively) until the dough attained an appropriate machinable consistency. The dough was then rolled through a hand-operated double roller to achieve a uniform thickness, cut into strips, baked for 10 minutes at 375 degrees Fahrenheit, and fried in Olean for 30 seconds at 375 Fahrenheit.

Base ingredients:

| | |
|---|---|
| Starch (see below) | 25 |
| Gluten (initial) | 3 |
| Water (initial) | 15 |
| Salt | 1 |

| Experiment Number | Added gluten | Added water | Starch type | Notes |
|---|---|---|---|---|
| 1 | | 4 | Unmodified Corn Starch | Good, crunchy, but tough |
| 2 | | 0 | Unmodified Potato Starch | Excellent. Very crispy, a little hard |
| 3 | | 10 | Novelose 260 (RS-II) | Good. A little softer and starchier. Some aftertaste. |
| 4 | 3 | 20 | Novelose 330 (RS-III) | Awful, inedible |
| 5 | | 4 | FiberSym 70 (RS-IV) | Brittle, crumby, a little starchy, silty, tough to chew |
| 6 | | 2 | FiberSym 80 (RS-IV) | Excellent, very crispy |

Summary: Using the FiberSym 80 product, which contains the highest percentage of resistant starch, provides a very acceptable product, the product, prior to frying in Olean, provides 1.15 calories per gram on a dry weight basis, within the range of 1 to 3.25 calories per gram of the present invention. Since Olean contributes no calories, but some weight, the final product would provide even fewer calories. The actual number is unknown, due to the difficulties inherent in estimating Olean uptake, but it is estimated to be at least as low as 1 calorie per gram.

V. Standard Pasta

All of the ingredients were combined and kneaded for 5 minutes. The dough was then formed into a ball and allowed to rest for 5 minutes. It was then rolled through a hand-operated double roller to a uniform thickness, cut into strips, and hung to dry for 8 hours. Finally the pasta was boiled in water for 5-10 minutes, until al dente.

| | |
|---|---|
| Starch (see below for starch type) | 21 |

-continued

| | |
|---|---|
| Gluten | 6 |
| Salt | 0.3 |
| Whey Protein Concentrate | 1 |

| Experiment Number | Starch type | Water | Notes |
|---|---|---|---|
| 1 | Novelose 260 (RS-II) | 20 | Refused to cook and get limp Starchy, grainy; unacceptable |
| 2 | Novelose 330 (RS-III) | 30 | Starchy, grainy, chewy, leaves mouth kind of dry; unacceptable |
| 3 | FiberSym 70 (RS-IV) | 14.5 | Very good, strongly reminiscent of real pasta |
| 4 | FiberSym 80 (RS-IV) | 15 | Good, though slightly softer than FiberSym 70 version; acceptable |

Several successful attempts were then made to salvage the Novelose 260 version.

| | |
|---|---|
| Gluten | 6 |
| Salt | 0.3 |
| Whey Protein Concentrate | 1 |

| Experiment Number | Novelose 260 (RS-II) | Wheat Fiber | Guar Gum | Oil | Water | Notes |
|---|---|---|---|---|---|---|
| 5 | 19 | 2 | | | 20 | Sticky, starchy, chewy, unacceptable |
| 6 | 11 | 10 | | | 30 | Too fibrous |
| 7 | 11 | 10 | 0.3 | 2 | 23 | Too fibrous, though harder |
| 8 | 16 | 5 | | | 23 | Too fibrous, though harder |

VI. Egg Noodles

All of the ingredients were combined and kneaded for 5 minutes. Water was added as demanded by the consistency of the dough. The dough was then formed into a ball and allowed to rest for 5 minutes. It was then rolled through a hand-operated double roller to a uniform thickness, cut into strips, and left to dry in the air for 10 minutes. Finally the pasta was boiled in water for 5-10 minutes, until al dente.

| | |
|---|---|
| Starch (see below for starch type) | 21 |
| Gluten | 4 |
| Whole Eggs | 10 |

| Experiment Number | Starch Type | Xanthan Gum | Water | Notes |
|---|---|---|---|---|
| 1 | FiberSym 70 (RS-IV) | | 5 | Starchy, not enough resistance to bite-through |
| 2 | FiberSym 70 (RS-IV) | 0.2 | 5 | Gummy |

-continued

| Experiment Number | Starch Type | Xanthan Gum | Water | Notes |
|---|---|---|---|---|
| 3 | FiberSym 80 (RS-IV) | | 5 | Cooked very fast. Not enough resistance to bite-through or body |
| 4 | Novelose 260 (RS-II) | | 10 | Starchy, grainy |
| 5 | Novelose 260 (RS-II) | 0.2 | 10 | Starchy, grainy |
| 6 | Novelose 260 (RS-II) | 0.2 | 7.5 | Starchy, grainy |
| 7 | Novelose 330 (RS-III) | 0.2 | 20 | Starchy, grainy |

VII. Crisps 3

These experiments were conducted by combining the FiberSym 80 and salt with 3 g of Vital Wheat Gluten and 15 g of water. Additional gluten and water were added in 1 g increments until the dough attained an appropriate machinable consistency. The dough was then rolled through a hand-operated double roller to achieve a uniform thickness, cut into strips, baked for 10 minutes at 375 degrees Fahrenheit, and fried in Olean for 30 seconds at 375 Fahrenheit.

Base ingredients:

| | |
|---|---|
| FiberSym 80 | 25 |
| Gluten (initial) | 3 |
| Water (initial) | 15 |
| Salt | 1 |

| Experiment Number | Added Water | Wheat Fiber | Whole Egg | Added Gluten | Notes |
|---|---|---|---|---|---|
| 1 | 2 | | | | Good |
| 2 | 10 | 3 | | 1 | Good. Crispier, tougher to chew |
| 3 | 5 | 3 | 5 | 1 | Good. Soft, broke up very easily in mouth in a positive fashion |

These experiments were conducted by combining the all of the ingredients except for the Potato Flakes (when present in the experiment) and an amount of water equal to the weight of the Potato Flakes called for in the experiment (i.e., 5 g of water for 5 g of flakes, 10 g of water for 10 g of flakes). The dough was then rolled through a hand-operated double roller to achieve a uniform thickness. At this point the potato flakes were lightly combined with the corresponding amount of water and worked into the dough. Additional water was added in 0.5 g increments until the dough attained an appropriate machinable consistency. The dough was then cut into strips, baked for the specified number of minutes at 375 degrees Fahrenheit, and fried in Olean for 30 seconds at 375 Fahrenheit.

Base ingredients:

| | |
|---|---|
| Gluten | 2 |
| Salt | 0.5 |

| Experiment Number | FiberSym 80 | Potato Flakes | Shortening | Total Water | Bake Time (in minutes) | Notes |
|---|---|---|---|---|---|---|
| 4 | 25 | 0 | 0.5 | 16.5 | 5 | Good |
| 5 | 20 | 5 | 1 | 18 | 5 | Better |
| 6 | 15 | 10 | 1 | 20 | 4 | Best |

VIII Flavored Pasta

The most successful version of the STANDARD PASTA was adapted with flavoring, using the same procedures as above. All of the ingredients were combined and kneaded for 5 minutes. The dough was then formed into a ball and allowed to rest for 5 minutes. It was then rolled through a hand-operated double roller to a uniform thickness, cut into strips, and hung to dry for 8 hours. Finally the pasta was boiled in water for 5-10 minutes, until al dente.

| | Experiment Number | | |
|---|---|---|---|
| Ingredient | 1 | 2 | 3 |
| FiberSym 70 | 21 | 23 | 22 |
| Gluten | 6 | 6.4 | 6.5 |
| Salt | 0.5 | 0.5 | 0.5 |
| Whey Protein Concentrate | 1 | 1 | 1.5 |
| Tomato Paste | 7 | | 7 |
| Spinach | | 8 | |
| Water | 12 | 13 | 10.5 |
| Notes | Too soft | Good | Good |

IX. Cheese Crackers

The dough in this experiment was rolled through a hand-operated double roller to achieve a uniform thickness, cut into strips, baked for 15 minutes at 325 degrees Fahrenheit, turned over, and baked for an additional 3 minutes again at 325 degrees Fahrenheit.

Experiment 1

| | |
|---|---|
| FiberSym 80 | 21 |
| Gluten | 4 |
| Salt | 0.2 |
| Paprika | 0.3 |
| WCB | 3.5 |
| Crisco | 1.8 |
| EMC Cheddar | 0.5 |
| Water | 10 |

X. Instant Noodles

All of the ingredients were combined and kneaded for 5 minutes. Water was added as demanded by the consistency of the dough. The dough was then formed into a ball and allowed to rest for 5 minutes. It was then rolled through a hand-operated double roller to a uniform thickness and cut into thin strips. At this point, the experiment was optionally boiled in water for 2.5 minutes (indicated in chart). All experiments were then deep-fried in vegetable oil at 375 Fahrenheit for 1.5 minutes. Finally, the noodles were placed in Styrofoam cup which was then filled with boiling water, covered, and allowed to sit for 5 minutes.

Base ingredients:

| | |
|---|---|
| FiberSym 70 | 21 |
| Salt | 0.3 |

| Experiment Number | Gluten | WPC | Guar Gum | Water | Boiled? | Notes |
|---|---|---|---|---|---|---|
| 1 | 4 | 1 |  | 14.5 | No | Bit through to easily, not much resistance, soft and quick-dissolving |
| 2 | 6 | 1 |  | 14.5 | No | Bit through to easily, not much resistance, soft and quick-dissolving |
| 3 | 6 | 1 |  | 14.5 | Yes | Acceptable, but a little too soft |
| 4 | 6 | 1 | 0.3 | 15 | No | A little too hard |
| 5 | 6 | 1 | 0.3 | 15 | Yes | Still a little too hard |
| 6 | 6 | 1 | 0.15 | 14.5 | No | Acceptable |
| 7 | 6 | 1 | 0.15 | 14.5 | Yes | Acceptable, but a little too soft |
| 8 | 6 |  | 0.15 | 14.5 | No | Acceptable |
| 9 | 6 |  | 0.15 | 14.5 | Yes | Acceptable, slightly rubbery |

It is understood that the above examples are illustrative of the present invention and that changes may be made may be made in ingredients, formulations, processing and the like without departing from the scope of the present invention as defined in the following claims

What is claimed is:

1. A starch-based flour food product comprised primarily of a starch-based flour and selected from the group consisting of baked goods, breads, cakes, cereals, pasta, and pastries having been prepared at a temperature of at least 100° C. to a final food product and having in the range of 1 to 3.25 calories per gram, on a dry weight basis, the starch-based flour comprising a sufficient amount of type IV resistant starch wherein the total dietary fiber within the final food product arising from the type IV resistant starch comprises 14-60% of the final food product by weight after the temperature preparation of at least 100° C.

2. The food product of claim 1 wherein the food product is selected from the group consisting of cookies, cakes, crisps, instant noodles, crackers, cheese crackers, pasta, muffins, brownies, breakfast cereals, pizza crust, bread, doughnuts; biscuits, pie, wafers and egg noodles.

3. The food product of claim 1 wherein the resistant starch-based flour comprises one of a batter, a mix and a dough for making the final food product at a temperature of at least 100° C.

4. The food product of claim 1 with the final food product having in the range of 1 to 2.66 calories per gram, on a dry weight basis.

5. The food product of claim 1 wherein the starch-based flour comprises starch as the sole flour ingredient.

6. The food product of claim 1 wherein the starch-based flour comprises starch and gluten.

* * * * *

UNITED STATES PATENT AND TRADEMARK OFFICE
CERTIFICATE OF CORRECTION

| | |
|---|---|
| PATENT NO. | : 9,668,488 B2 |
| APPLICATION NO. | : 11/160328 |
| DATED | : June 6, 2017 |
| INVENTOR(S) | : David Holzer and Shalom Aryeh Holzer |

It is certified that error appears in the above-identified patent and that said Letters Patent is hereby corrected as shown below:

In the Claims

Claim 1, Column 19, Line 32, "the final food product by weight after" should read --the final food product by weight, on a dry weight basis, after--

Signed and Sealed this
Fifteenth Day of August, 2017

Joseph Matal
*Performing the Functions and Duties of the
Under Secretary of Commerce for Intellectual Property and
Director of the United States Patent and Trademark Office*